United States Patent [19]

Lake et al.

[11] Patent Number: 4,617,663

[45] Date of Patent: Oct. 14, 1986

[54] INTERFACE TESTING OF SOFTWARE SYSTEMS

[75] Inventors: Carole J. Lake, Freehold; James J. Shanley, Middletown; Steven M. Silverstein, Red Bank, all of N.J.

[73] Assignee: AT&T Information Systems Inc., Holmdel, N.J.

[21] Appl. No.: 785,029

[22] Filed: Oct. 7, 1985

Related U.S. Application Data

[63] Continuation of Ser. No. 484,465, Apr. 13, 1983, abandoned.

[51] Int. Cl.⁴ .............................................. G06F 11/00
[52] U.S. Cl. .................................... 371/25; 371/19; 371/20
[58] Field of Search ................... 371/20, 23, 16, 19, 371/25; 364/200, 900; 324/73 R

[56] References Cited

U.S. PATENT DOCUMENTS

| | | | |
|---|---|---|---|
| Re. 31,056 | 10/1982 | Chau et al. | 324/73 R |
| 3,916,306 | 10/1975 | Patti | 324/73 R |
| 3,976,940 | 8/1976 | Chau et al. | 371/25 X |
| 4,055,801 | 10/1977 | Pike et al. | 371/25 X |
| 4,070,565 | 1/1978 | Borrelli | 371/20 |
| 4,300,207 | 11/1981 | Eivers | 364/900 |
| 4,312,066 | 1/1982 | Bantz et al. | 371/16 |
| 4,312,067 | 1/1982 | Shirasaka | 371/25 |
| 4,313,162 | 1/1982 | Baun et al. | 364/200 |
| 4,313,200 | 1/1982 | Nishiura | 371/25 |
| 4,314,110 | 2/1982 | Briedenstein et al. | 179/175.2 R |
| 4,314,329 | 2/1982 | Crewe et al. | 364/141 |
| 4,342,093 | 7/1982 | Miyoski | 371/23 |
| 4,354,268 | 10/1982 | Michel et al. | 371/20 |
| 4,397,021 | 8/1983 | Lloyd | 371/20 |
| 4,402,055 | 8/1983 | Lloyd | 364/900 |
| 4,510,583 | 4/1985 | Walz | 364/900 |
| 4,550,406 | 10/1985 | Neal | 371/20 |

Primary Examiner—Michael R. Fleming
Attorney, Agent, or Firm—D. H. Tannenbaum

[57] ABSTRACT

There is disclosed an arrangement for testing each portion of a system by stimulating at an interface of the system the expected responses. Software scripts are pregenerated and compiled into system message commands. Each script contains sequences of expected message responses as well as stimuli messages. The system is designed to use a single interface without regard to the type of simulated messages.

15 Claims, 20 Drawing Figures

MSG/DATA
- MSG_INDEX - REFERENCE VALUE
- MSG_NAME - ACRONYM
- MSG_TYPE - TYPE OF MSG (STIM, RESPONSE)
- MSG_LEN - LENGTH IN BYTES
- MSG_NARGS - NO. OF ARGUMENTS
- MSG_NFIELDS - NO. OF FIELDS

FIG. 10

FIELD DATA
- FLD_INDEX - REFERENCE VALUE
- FLD_NAME - ACRONYM
- FLD_BSTART - START BIT POS. OF FIELD
- FLD_BEND - END BIT POS OF FIELD
- FLD_TYPE - FIELD TYPE (FIXED, INPUT)
- FLD_CONV - CONVERSION RULE
- FLD_DEFAULT - DEFAULT OR FINAL VALUE
- FLD_ARGN - ARGUMENT NO ASSOCIATED WITH FIELD
- FLD_MAX - MAX ALLOWED VALUE
- FLD_MIN - MIN ALLOWED VALUE

```
              SCRIPT COMMANDS
SEND MSG P1, P2,...Pn
WAIT THRESHOLD MSG P1, P2,...Pn
BWAIT THRESHOLD LABEL MSG P1, P2,...Pn
MWAIT THRESHOLD LABEL
        <
                MSG 1 P11, P12,...P1n
                MSG 2, P21, P22,...P2n
        >
        :
SWAIT THRESHOLD LABEL
        <
                LABEL 1 MSG 1 P11, P12,...P1n
                LABEL 2 MSG 2 P21, P22,...P2n
        >
        :
LOCAL VARIABLE = INIT_VALUE(S)
GLOBAL VARIABLE = INIT_VALUE(S)
DONTCARE VARIABLE = INIT_VALUE(S)
SET VARIABLE 1 VARIABLE 2
SET VARIABLE 1 VARIABLE 2 OPERATOR VARIABLE 3
IF VARIABLE 1 COMPARISON VARIABLE 2 LABEL
GOTO LABEL
DELAY THRESHOLD
PSTRING "STRING"
PVARIABLE VARIABLE
FLUSH
DUMP
HALT
CALL LABEL (P1, P2,...Pn)
RETURN
SUBROUTINE (A1, A2,...An)
ENDSUBROUTINE
```

```
# INITIALIZE STATIONS OF SYSTEM UNDER TEST                    (1)
        LOCAL $STATION                                        (2)
        LOCAL $MAX_STNS=10;                                   (3)
        SET $STATION 2                                        (4)
:INIT_LOOP                                                    (5)
        SEND PUSH 7 $STATION                                  (6)
        WAIT $WAIT_TIME :LAMP_ERR LAMP_ON 7 $STATION          (7)
        PSTRING BUTTON 7 SELECTED                             (8)
        SET $STATION $STATION+1                               (9)
        IF $STATION <= $MAX_STNS :INIT_LOOP                   (10)
        GOTO :DONE                                            (11)

:LAMP_ERR PSTRING BUTTON 7 NOT SELECTED                       (12)

:DONE HALT                                                    (13)
```

INTERFACE TESTING OF SOFTWARE SYSTEMS

This application is a continuation, of application Ser. No. 484,465, filed Apr. 13, 1983, now abandoned.

BACKGROUND OF THE INVENTION

This invention relates to test systems and more specifically to a system using simulated messages at specific system interfaces.

Software systems are becoming increasingly complex and as the complexity grows so does the complexity of the test procedures used to verify the validity of system operation. Such test procedures are used at various stages of system development. For example, many software systems are divided into layers or subsystems with each section designed by a different team of computer scientists to perform certain specific functions. Often it is desired to test and verify the integrity of a section design even before the other subsystems are complete.

In communication systems, in addition to the internal interfaces between software sections, there is a complex interface between the system and communication terminals connected to the system. Prior to connecting actual users to the system it is necessary to test overall system performance under a wide variety of conditions and under various simulated loading. Problems exist when it is desired to perform these tests prior to the availability of either the interface circuits or the actual terminals.

Other problems, such as simulating the actual communication connection or an actual loading situation, are presented even when the entire system is complete because it is impractical to actually place the calls through the system. These problems deal, primarily, with finding faults in the software, that might only provide an instantaneous fault condition. Problems also occur when testing during the development state of the system, since it is not always clear that the system will behave as expected and thus the internal controls of the system cannot be relied upon to provide error messages or error control.

SUMMARY OF THE INVENTION

These and other problems are solved by a testing arrangement which is adapted for connection to a system at any interface of the system. The testing arrangement relies on premade scripts which are retrieved from a memory. These scripts contain the information for generating the necessary bit patterns for communication to the system at the selected interface. The scripts also contain bit patterns representative of the desired results of the applied stimulus. The scripts are prepared in a high level language and translated to the language accepted at the interface of the system under test. The scripts thus can remain relatively constant over a number of different interface points. A special access circuit is used to control the flow of script data to and from the access interface.

DESCRIPTION OF THE DRAWING

These and other objects, features, and advantages will be more fully understood from a reading of the following descriptions of one embodiment of our invention taken in conjunction with the drawing in which.

DETAILED DESCRIPTION

Figure 1:
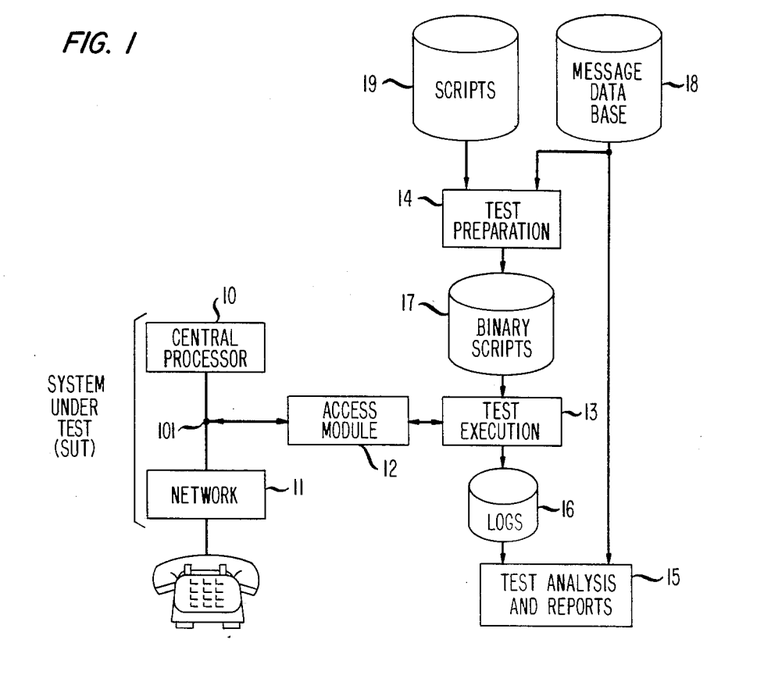
FIG. 1 is a block diagram of the test system.

One embodiment of our invention is shown in FIG. 1 where the test arrangement is used to simulate a number of telephone stations placing calls to and from the system. Node 101 between switching network 11 and central control 10 has been selected as the point where the data generated by the scripts will be applied to the system. This same node will be the point where system responses will be monitored to determine if the system is performing as expected. It should be understood that any one of several nodes could have been chosen and the actual information bits provided would be modified accordingly. Typically, the selected mode is a common point where messages from a large number of subsystems or peripheral terminals are concentrated. Also, in situations where the system is not yet complete the expected responses could be modified to accommodate early testing. Thus, the system we are about to describe is dynamic in nature and the discussion which follows is applicable over a wide range of situations.

As shown in FIG. 1, access module 12 is advantageously a hardware interface which, as will be more fully discussed hereinafter, is used to insert and extract data signals into and from the portion of the system under test. These signals come from test execution module 13 under control of binary scripts from memory 17. The scripts in turn come from script memory 19 under control of test preparation module 14.

When a message is received from the system it is analyzed under control of module 15 operating in conjunction with log memory 16 and message data base 18.

It is important, however, that the system under test either have a message based architecture, that is, composed of subsystems that have message interfaces or that an access module can be designed to present a message interface to the test system. Node 101 is one such interface. Access module 12 monitors messages flowing between central control 10 and network 11 and also provides timing information for controlling information flow. Another function of access module 12 is the insertion of stimuli either into the central control or into the network if present. These stimuli cause the testing arrangement to drive the communication system for testing purposes.

The testing arrangement is actually a message utility which generates, manipulates, and verifies sequences of messages and can be customized to work with messages from any system under test by means of a message data base, 18.

The tester, before the test sequence begins, must enter, in data base 18, descriptions of all the messages that pass between central control 10 and the network 11. The messages are described in a language that allows conversion between a tester's conception of the messages and the actual messages that flow between the subsystems in question.

Once the message data base is established, the testing arrangement is capable of generating sequences of stimuli messages and verifying the resulting messages against expected responses.

The tests are entered via script files 19. The scripts are basically composed of sequences of stimuli and response messages that define system behavior. The script can specify a strict order of response acceptance or can allow for certain of the responses to be unordered. In addition, the scripts may contain variables in both applied messages and expected results. The scripts contain control commands in a programming language allowing for tests looping through a sequence, changing variables and branching to accommodate various optional systems features.

Scripts are entered using a test editor in a language that is understood by testers because the nouns and verbs relate to system components and operations. One function of the testing system is to convert this script language into messages that flow between central control 10 and network 11. This conversion is accomplished by test preparation module 14 which reads prepared scripts and converts the messages and control information provided by the tester into an executable form called a binary script. These binary scripts are stored in memory 17. Test preparation module 14 achieves this result, under software control, by consulting message data base 18 to convert the desired messages into a form acceptable by the system under test.

Once the binary scripts are generated, test execution module 13 is used to execute these scripts. The test execution module is capable of executing more than one script at a time to allow realistic testing scenarios. Thus, one script may be testing, for example, station to station calls while a second script may be concurrently testing direct outward dialing calls. Test execution module 13 reads binary scripts and interprets commands much like a computer control unit. When it encounters a stimuli to inject into the system under test, it orders access module 12 to inject the message either into central control 10 or into the network 11 at node 101. Test execution module 13 also monitors messages that return from the access module. These messages are either specified in the script as valid responses or they are exceptional conditions that were not specified. In either case, all stimuli and response messages are logged into log files 16 as the test progresses.

When the test is completed the tester uses test analysis module 15 to examine these logs. Module 15 converts the log messages back to a form familiar to the tester. This form typically would be in the same language the tester used to design the scripts in the first place.

Three types of reports are available through test analysis module 15 and logs 16. The first is a trace of all the messages inserted during the test. The second is a trace of inserted messages and resulting responses. This provides a blow-by-blow description of every transaction occurring during the test. The third form is called the exception report. This report contains the messages returned from the system under test that were not specified in the scripts, as well as all messages that were specified in the scripts as responses, but were not returned from the system or were not returned in the correct sequence. Also included are diagnostics generated by the execution of the scripts.

By examining these reports a tester cannot only determine if the system passed the test, but in the case of failures, can also establish what went wrong.

Figure 2:
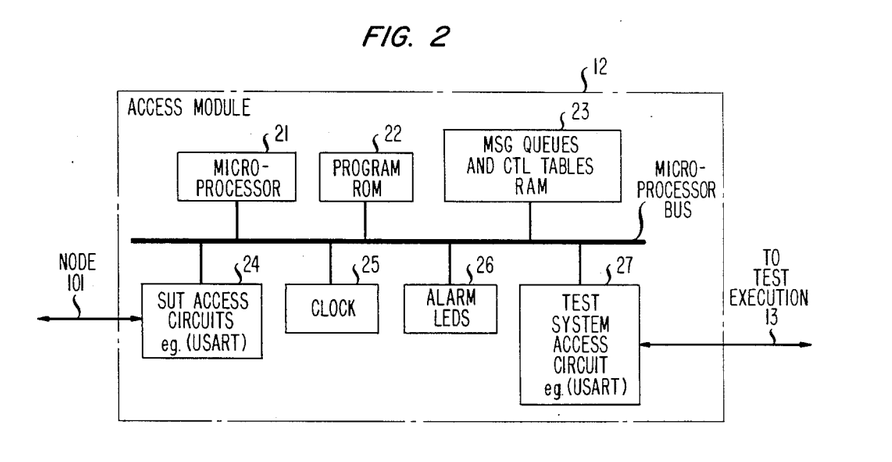
FIG. 2 is a more detailed block diagram of the access module of the test system.

FIG. 2 is a hardware block diagram of the access module 12. This is a microprocessor based circuit in which all components communicate over a microprocessor bus. Microprocessor 21 which advantageously can be an intel 8051 is driven by programs stored in the ROM 22. The system under test (SUT) access circuits 24 allows access module 12 to monitor the node 101 message interface of the system under test. These messages are retrieved over the access circuits and moved into RAM 23 which is composed of message queues as well as control tables. Program ROM 22 directs microprocessor 21 to use the test system access circuits 27 to send the messages back to the test system at appropriate times. In the opposite direction, messages from the test system are retrieved over access circuits 27 and stored in message queues in RAM 23. At the appropriate time, messages are injected into node 101 through access circuits 24. Clock circuit 25 drives the microprocessor and also provides timing information allowing the access module to recognize time delays in the data. Finally, alarm LEDS 26 allow the tester to visually monitor the state of the access module.

FIGS. 3 through 7 define the microcomputer software control residing in program ROM 22 of access module 12. This software is interrupt driven and the figures depict the main control paths (e.g., error legs are not shown).

Figure 3:
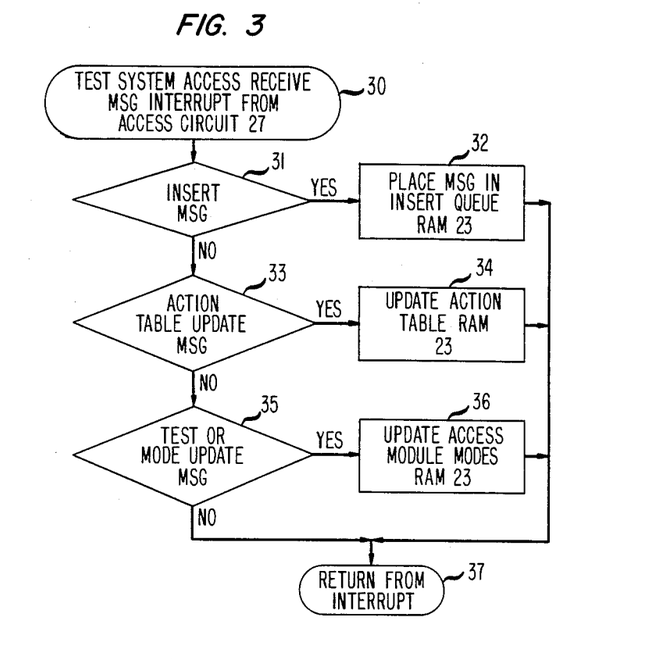
FIGS. 3-7 are flow-charts showing the operation of the access module.

FIG. 3 shows the test system access receive message interrupt. This software is activated when the test system access circuits 27 indicate that a message has arrived from test execution module 13. Step 31 checks if this is a message to insert into the system under test. If that is the case, the software step 32 places the message into an insert queue in RAM 23 of FIG. 2. Then it returns from the interrupt. If it is not a message to insert, step 33 checks if the message is an action table update message. These messages instruct the access module microprocessor how to handle each particular type of received message. This information is sent before testing commences to initialize the system allowing it to focus on particular aspects of operation. When one of these messages arrives, the action table stored in RAM 23 will be updated as shown in step 34. Finally, there are mode update messages and communication test messages that the access module detects in step 35. If the received message is a mode update or test message, the access module mode variables that are stored in RAM 23 are updated as shown in 36. These messages change operating modes or initialize self-test operations.

Figure 4:
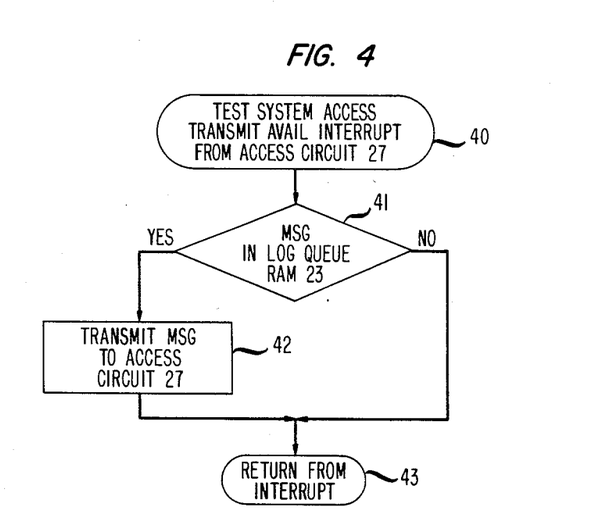

FIG. 4 shows the test system access transmitter available interrupt sequence. This interrupt sequence, is activated whenever the test system access circuits 27 in FIG. 2 indicate that it is valid to send a message to the test system. If there is a message ready to be sent in the log queue, RAM 23, it is transmitted as shown in step 42. All messages destined for the minicomputer supporting the test system flow through this log queue. If there are no messages in the queue at this point a branch is taken to step 43 to return from the interrupt. However, if there are messages in the log queue, step 42 loads these messages into the test system access circuits. These circuits then transmit the messages to the minicomputer.

Figure 5:
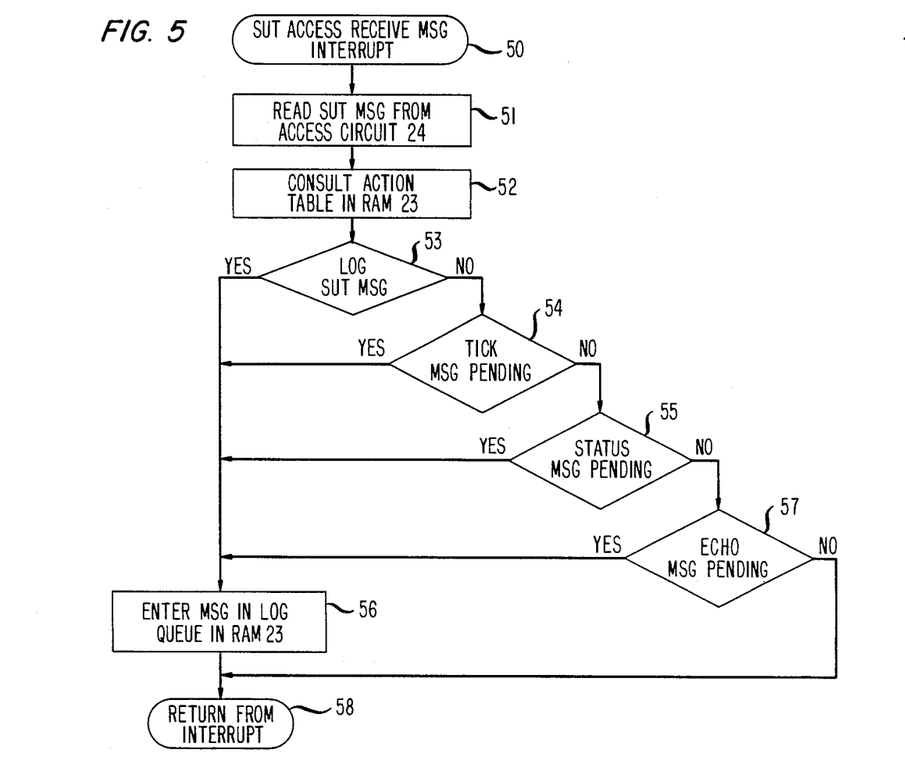

FIG. 5 shows the system under test (SUT) access circuit receive message interrupt routine. When the system under test access circuit receives a message transmitted across node 101, it generates an interrupt and step 50 is evoked. Step 51 reads the system under test access circuitry to retrieve the message from the access circuits. Step 52 consults the action table to determine the message treatment based on the environment set-up when the test was initiated. Step 53 determines if the message just received is to be saved. If it is to be saved step 56 is executed and the message is entered into the log queue in RAM 23. If the message is not to be logged, a determination is made as to whether there are any other messages available to send back to the minicomputer. Step 54 detects if there are any timing messages in a pending buffer. If there are, it will enter the message into the log queue using step 56 and return from the interrupt. If there are no timing messages there may be state messages indicating, for example, error conditions that may have been detected. These are detected by step 55 and routed by step 56 into the log queue, stored in RAM 23. Finally, the access module is designed to echo any messages that it has inserted into the system under test back to the minicomputer as well. The echoed messages and returned messages are converted by the test system to a sequence of stimuli and responses for storage in log files. Step 57 determines if there are any echotype messages stored in the echo buffer. If there are step 56 will enter them into the log queue. The interrupt terminates at step 58.

Figure 6:
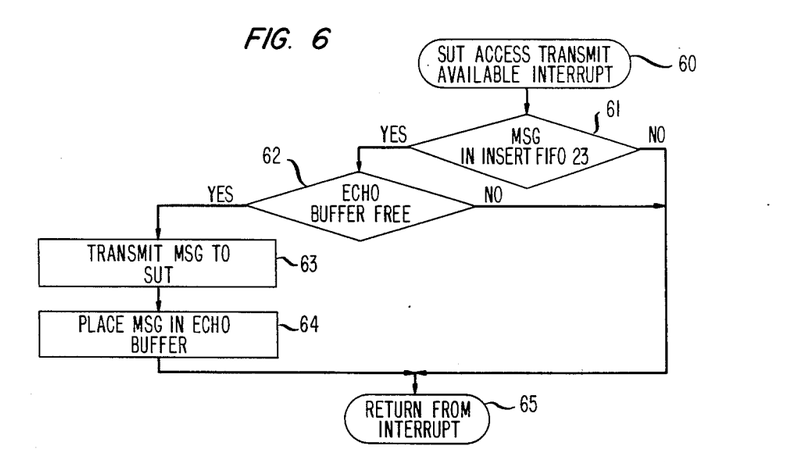

FIG. 6 is the system under test transmit available interrupt. When access circuitry 24 determines that the access module can insert a message into the SUT, step 60 is invoked. First step 61 determines if there are any messages stored in the access modules insert queue of RAM 23. If there are none the interrupt returns. If there is a message, another check is performed at 62 to make sure the echo buffer is free. This buffer is used in FIG. 5 to echo inserted messages back to the minicomputer through the log queue. If a message is available and the echo buffer is free, the message is transmitted by step 63 to the system under test using access circuitry 24 and placed in the echo buffer by step 64. Then the interrupt routine terminates.

Figure 7:
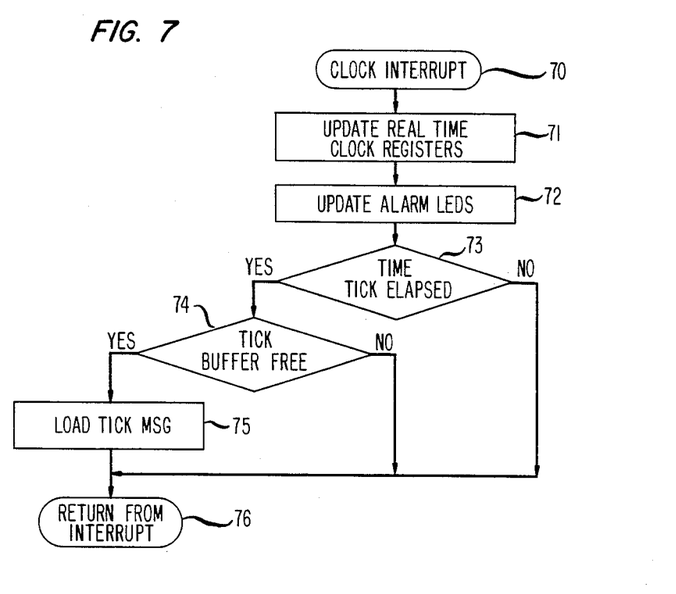

FIG. 7 is the interrupt routine invoked by clock circuitry 25. This circuitry periodically interrupts the microprocessor to provide a timing base. Thus, clock interrupt 70 is invoked periodically and, as shown in step 71, the real time clock registers within RAM 23 are updated. Block 72 updates Alarm LEDS 26 (FIG. 2).

Next, the software checks to determine if enough time has elapsed to warrant generating a time-tick message. This check is performed by step 73. If enough time has not elapsed the interrupt returns through step 76. If sufficient time has elapsed, the tick buffer is checked. If the buffer is not free, as determined by step 74, the routine terminates at step 76. However, if the tick buffer is free, a tick message is loaded into the buffer at step 75 and then the interrupt routine terminates. This time-tick message propagates through the log queue through the receive message interrupt shown in FIG. 5 and eventually out through the transmit interrupt shown in FIG. 4.

In summary, the software in FIGS. 2-7 directs the access module to record all messages passing through the central control and network message interface shown in FIG. 1. These messages are then passed to test execution software 13 running on the testing system. In the opposite direction, the access module can receive messages from the test execution software and transmit those through to the system under test's message interface.

Next the software residing in the test system will be discussed. This software is designed to handle any message based testing application since message definition resides in a separate data base accessed by the test system software. In order to achieve this, message data base 18 shown in FIG. 1, must first be composed. FIGS. 8, 9, 10 and 11 depict this data base.

Figure 8:
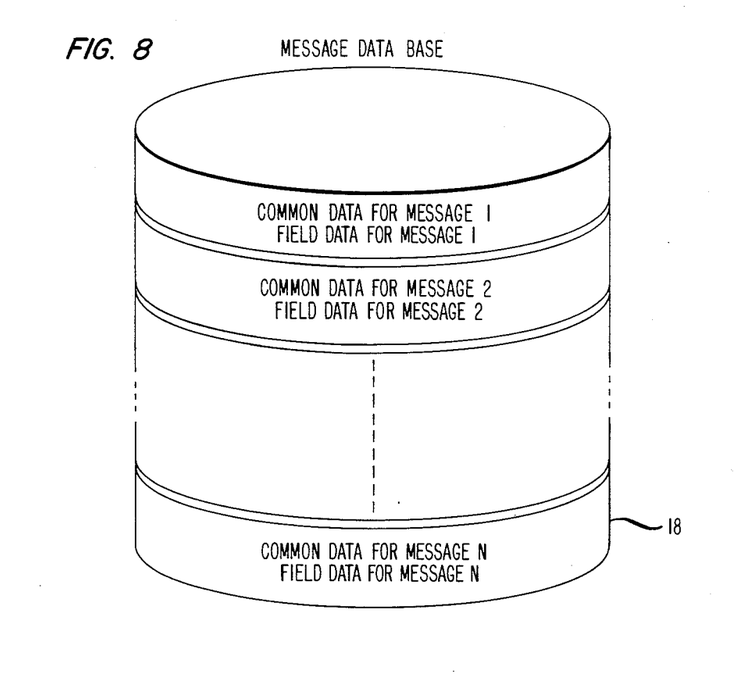
FIGS. 8-11 show more details of the message structure, FIG. 12 defines the script commands.
Figure 9:
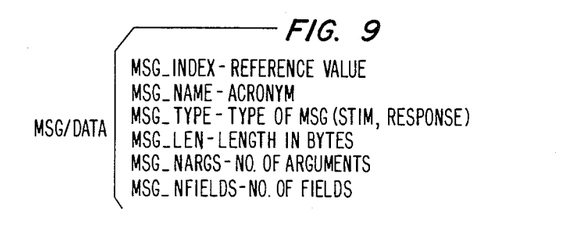

FIG. 8 shows a high level view of data base 18. Message information records are composed for each message passing between the central control and the network. The record consists of two parts, namely common data and field data. Common message data describes the message in general, and field data describes each field within the message. Each message is a stream of bits; this stream can be decomposed into logical groupings called fields. A record must be defined for each stimuli and response message that flows between the subsystems under test. FIG. 9 shows the common information kept for each message in the system. There is a message index which is a tag value used by the software to refer to the message. There is a message name or an acronym which denotes the message in the test script language. In a communications system one message might indicate a customer going off-hook on a terminal so the message name might be "off-hook". Then there is a message type that indicates whether the message is a stimulus or a response. The length of the message in bytes as well as the number of arguments in the message is recorded. Arguments are strings of information that the test designer provides to completely define the message. In the "off-hook" message, for example, an argument might be the station number. Finally, the number of fields in the message is recorded.

Figure 10:
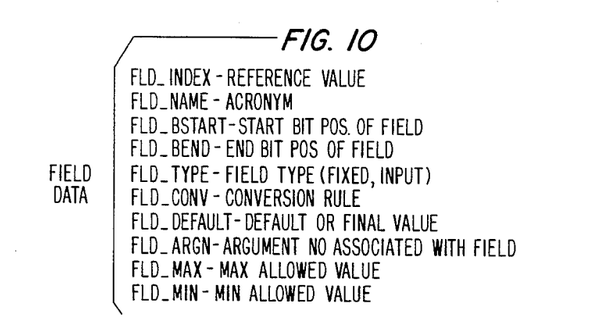

FIG. 10 shows field data. One of these records is supplied for each field in a message. For each field, we assign a field index used as a reference and a field acronym. The acronym is the name of the field the test designer would like to associate with the string of bits that make up the field (e.g., station number, operation code, button number). Then bit-start and bit-end values demark the field's bit position within the message. There is also a field type indicator that is used to indicate if the field is a fixed field, such as an action code, an operation code, or input for the message such as a button number or station number. The conversion field specifies how the software is to convert from the input string to the actual binary pattern during test preparation and test analysis. Also stored is a default value or fixed value for the case of fixed fields. Next an argument number is stored; this is a reference to information provided by the tester that specifies the value of converted field. Finally, there are maximum and minimum value indicators that are used for range checking during test preparation and test execution. This range check guarantees that messages have fields with values that are within proper ranges.

Figure 11:
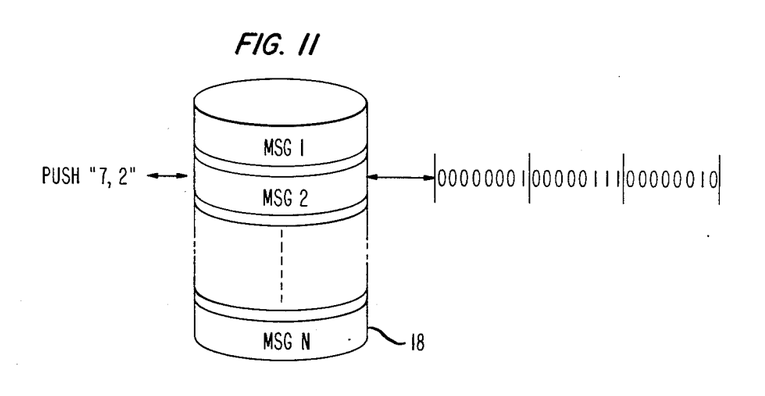

FIG. 11 shows an example of how this data base is used. In the center we see data base file 18 of FIG. 1. This file contains a sequence of preestablished records for each message in the system. Each record contains message data, defined in FIG. 9, and field data, defined in FIG. 10, for each field within the message. On the left we see the representation of a message in the test language (push 7,2) for pushing button seven on station two. The system under test does not communicate in phrases such as this, but communicates in binary strings such as the 3-byte message shown on the right. By consulting the data base, the system determines where the "push" message is defined and determines what fields are used in this message, and how to convert the "push"

and the arguments 7 and 2 into an understandable message. The result, for example, is the binary string shown on the right. This process, of course, can be inverted and the system can read the binary strings, break the messages into fields according to the template in the message data base and convert the bits to the string "push 7,2". Once this is achieved for each message, our testing arrangement is capable of testing the component subsystems that comprise the entire system by injecting stimuli and verifying that responses occur according to system design.

Figure 12:
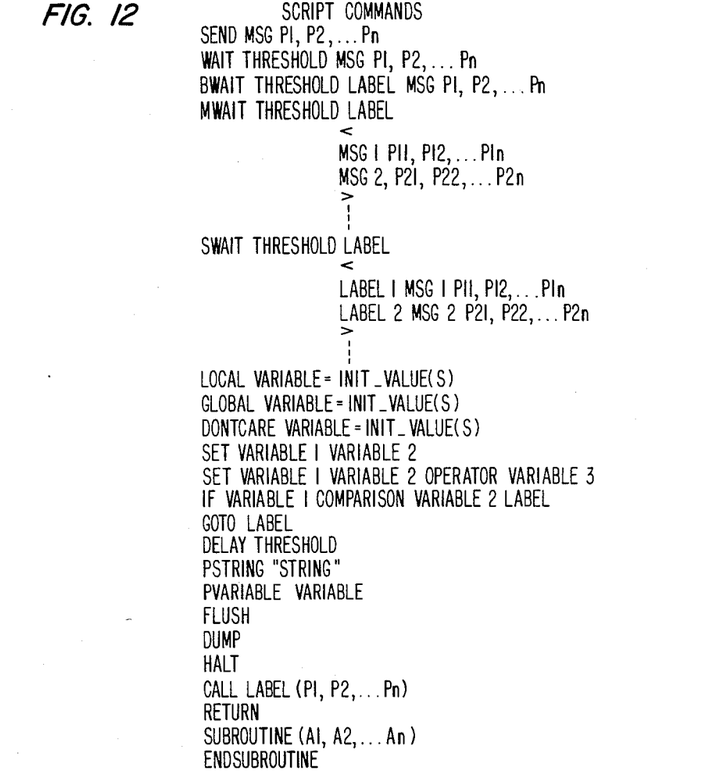

Tests are expressed in the script language, defined in FIG. 12. In order to inject stimuli, the "send" command is used. This command specifies a message as well as parameters. To verify responses, the test has a choice of four different wait commands. The first wait command, wait, is used to verify that a single message returns from the system within a time interval. The threshold variable indicates the time interval and the message and parameters are defined in the remainder of the command. The second wait, the branching wait, "bwait", provides one additional feature. If the single message response does not occur within the time interval, a branch is taken to the label reference. This allows the test to account for error conditions by taking alternate actions. An even more elaborate message verification command called the "mwait" allows the tester to verify that the response to a single stimulus message is a set of messages that may occur in any order. This command also has a threshold and label to indicate how long the system should wait for the return messages and where the script should transfer if the messages do not arrive. The messages, listed in brackets, each have parameters. The test execution software will verify that all the expected responses to a previous stimulus do occur regardless of their order of occurrence.

The last wait is the "swait" construct which also has a threshold and a label. The threshold again indicates how long to wait for the response message. The label is the transfer point if no messages occur. Within the brackets there are again messages and parameters. However, in addition each message has a label associated with it. When processing a "swait", the system examines response messages and checks to see if the response is one of the messages within the brackets. For whichever message that occurs first the script branches to the label indicated by that message. This selective mechanism allows the test decision to specify a list of many possible valid response conditions. The test designer can combine the "wait", "bwait", "mwait", and "swait" commands in any order to verify any response pattern.

Another control command in the script language is the "goto" statement which allows the script to take unconditional branches. There is an "if" construct that allows for the comparison of variables. Comparisons available are equal, greater than, less than, greater than or equal, less than or equal, and not equal. Thus, the script can compare two variables and transfer to a labeled statement depending on the status of the two variables. There is a "halt" command to halt a particular script's execution. There is a "flush" command to indicate to the test execution module that a particular script is no longer waiting for messages. A "dump" command provides script debugging capability by copying to a file the values of all the variables used in a script. The "call", "return", "subroutine", and "end subroutine" statements provide subroutine definition and access, which allows reuse and sharing of common test subsequences between test scripts.

There are three different types of variable declarations: local, global and don't care. Local variables are known within a particular script. They can be initialized and declared with the "local" command. Global variables are known across all scripts within a test and thus can be used to coordinate the activity of multiple scripts or to communicate translation information. These can be initialized and declared with the "global" statement.

Don't care variables are similar to local variables but when they are specified as parameters in a wait command, the system performs wild-card matches on the field defined with don't care variables; that is, any field value in a response message is accepted. Another property of these variables is that whenever a match occurs, the don't care variable captures and stores the value for subsequent script use.

Variables can be either scalars or arrays; arrays are single dimensional and can be referenced by subscripts which are either scalars or constants.

There are two print commands, "pstring" and "pvariable", that allow the test designer to generate diagnostics during the test execution. They are also useful for script debugging. There is a "set" command that allows the testers to assign values to variables, move variables from one place to another, and perform arithmetic or logical operations on two different variables and store the result in the third. Arithmetic operations available are addition, subtraction, multiplication, division, and modulus. Logical operations available are logical and, logical or, complement, exclusive or, left-shift, and right-shift operations. There is also a "delay" command that allows the tester to specify delay simulation for holding times or response intervals.

Thus, by combining messages with these control constructs, the test designer can define test scenarios-stimuli and expected system responses-in the form of a program. The tester can then activate the common software and the access module to execute these scripts and verify that in response to the simulated stimuli, the system behaves in a defined manner.

Figure 13:
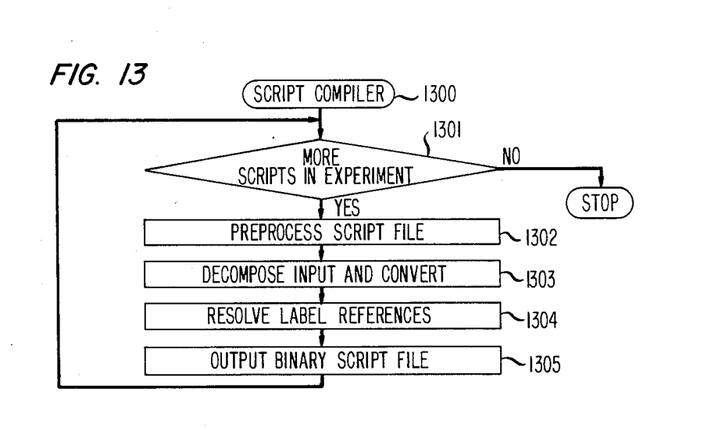
FIGS. 13-19 are flow-charts showing the processing of the scripts.
Figure 14:
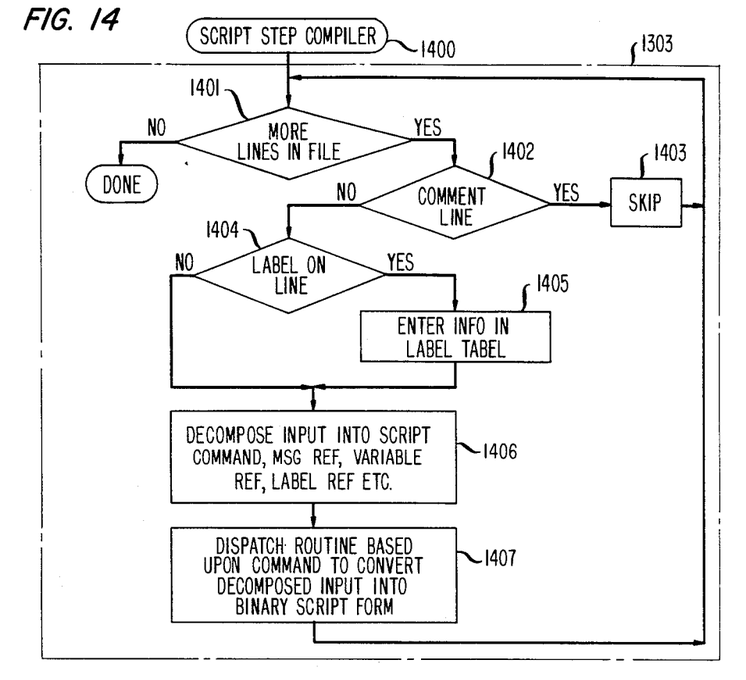

FIGS. 13 and 14 are flow-charts for the test preparation software. This software can be viewed as a script compiler. It is similar to many software language compilers. However, it has two special characteristics. First, a portion of the language is defined in a data base. The second special characteristic is its capability to compile multiple scripts at once so that they can be executed simultaneously.

Step 1301 determines if there are any more scripts in this test sequence. If there are no more, the software will stop. If there are scripts available, step 1302 performs preprocessing on the script file. Similar to other compilers, this compiler has a macro capability that provides string substitution, parameterized test substitution, and a file inclusion feature that allows standard header files to be included in a script. Step 1302 performs these steps. Step 1303 decomposes each input step and converts it into a binary script format. FIG. 14 expands this task. Step 1304 performs a second pass over the script so that forward and backward label references can be resolved. Once that is completed, step 1305 outputs the binary script and then the software loops back to step 1301 to determine if there are any more scripts available in this test. FIG. 14 is an expansion of step 1303 of FIG. 13. Here the input is decomposed and converted into an intermediate form called a binary script that can be executed by the test execution module. This software, step 1401, first determines if there are any more lines in the script file. If not, this operation is complete. If there are, step 1402 determines if a comment line has been scanned. Scripts have a commenting capability for documentation purposes. If it is a comment line, step 1403 skips over that line and returns to process the next line in the file. If it is not a comment line, step 1404 determines if there is a control transfer label on the line. If there is such a label, the label is entered into a label table by step 1405. In either case, processing continues at step 1406. This step decomposes the script input into a script command part, message reference parts, variable reference parts, label reference parts, operation parts, comparison parts, and initialization parts. The input is parsed using traditional compiler techniques.

These decomposed parts are passed to step 1407. Here, based on the script command the software dispatches a routine to handle that particular script command. Each script command has a binary form stored in the binary script file. Each form commences with an operation code followed by particular subcomponents that define the body of the script command. Each of these subcomponents are derived from the decomposed input generated by step 1406. For example, a command to send a message would be decomposed into a send operation code followed by information describing the message. In fact, for all the fixed fields and parameters that are constants, the message is actually converted into binary form and stored in the script. For those references such as variables whose values are not determinable at compilation time, step 1407 places in the binary script pointers into the variable table so that during execution those variables can be accessed, computed, converted, and placed into the appropriate bits in the message. In order to achieve this, information from the message data base such as the starting bit, ending bit, the conversion rules, maximum value and minimum value are placed into the binary file. After step 1407 completes the conversion, control is passed back to step 1401 where the process repeats.

Figure 15:
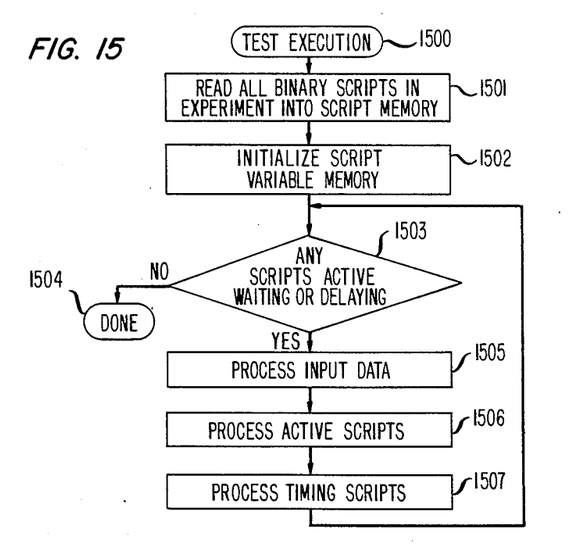

FIG. 15 is a flow-chart for the test execution module 13 shown in FIG. 1. As mentioned before, this module is capable of executing multiple scripts simultaneously. It is basically a parallel script interpreter that interprets and executes the binary scripts passed from the test preparation software. The first step 1501 reads all the binary scripts in the test into the memory. Step 1502 initializes any script variable memory required by the script and script processing commences at step 1503. Step 1503 determines if there are still any active, waiting, or delaying scripts within the experiment. If there are not, then all the scripts are complete, and testing is complete via step 1504. If there are scripts that are active, waiting, or delaying, then step 1505 is executed. This examines the input channel from the access module and processes the input data. Step 1506 will then process all active scripts. Next, step 1507 processes any timing scripts. 1503 through 1507 repeat until all scripts are completed.

Figure 16:
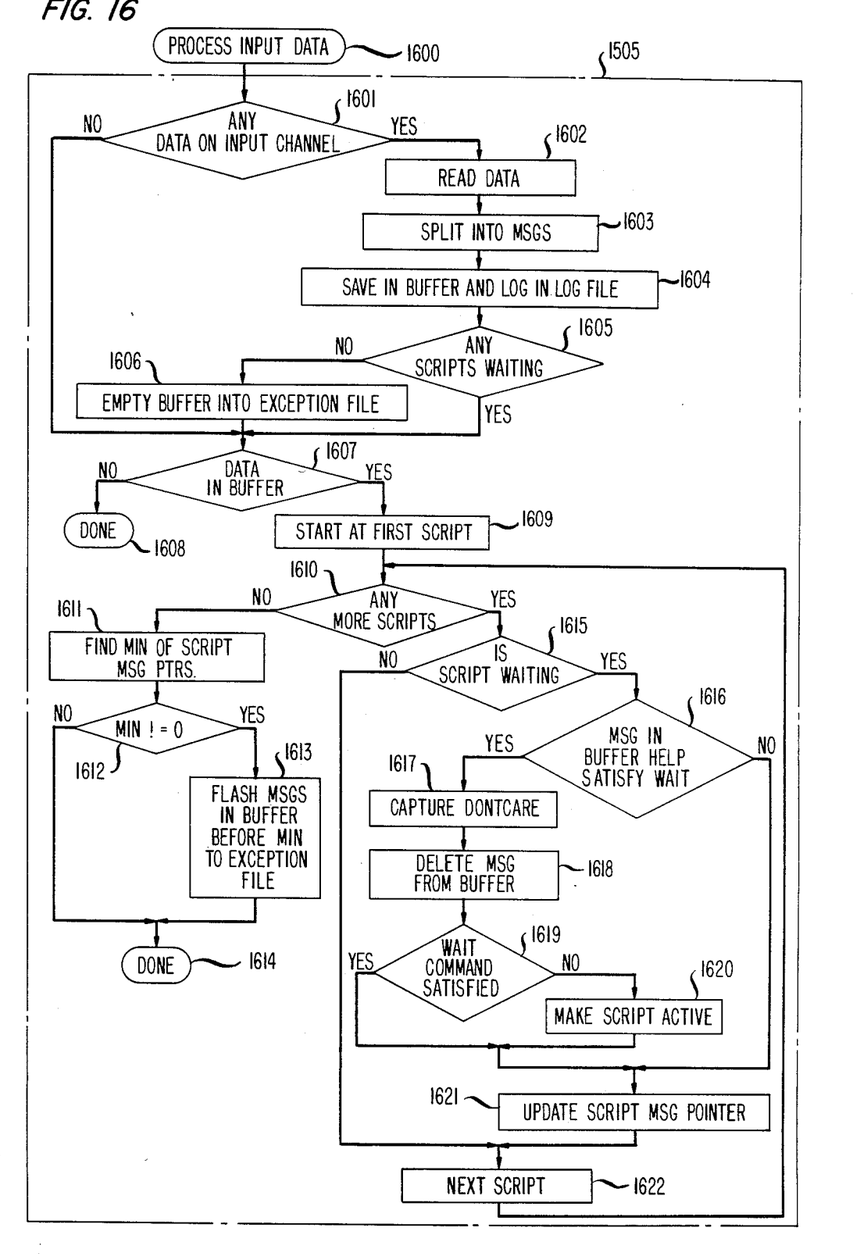

FIG. 16 is an expansion of step 1505 of FIG. 15 showing how input data is processed. Step 1601 determines if there is any data on the input channel from the access module. If there is, the data is read in by step 1602 and split into individual messages by step 1603. These messages are saved in an input buffer and also logged into the log file by step 1604. Thus as input is accumulated, the log file records all input received from the access module. These include response messages from the system under test, timer ticks as well as inserted message echos. The resultant file thus contains a step-by-step description of the test. The input buffer is next examined to determine message matching. Step 1605 determines if there are any scripts waiting. If there are not, all incoming messages are exception conditions and step 1606 empties the buffer into the exception file. However, if there are scripts waiting, processing must continue and step 1607 determines if there is any data in the input buffer. This may be input from the current cycle or unexamined input from previous cycles. If there is no data in the buffer, this phase of operation is complete at step 1608. However, if there are messages in the buffer, execution continues at step 1609 which sets the script count to the first script in the experiment. Step 1610 determines if there are any more scripts to examine in the experiment. If there are, step 1615 checks if the particular script's state indicates a waiting script. If the script is not waiting, control branches to step 1622 to increment the script counter. Then control loops back to step 1610 to determine if there are any more scripts to check. If step 1615 determines that a script is waiting, processing continues at step 1616 which examines messages in the input buffer and compares them to messages in the script to determine if input messages help satisfy or completely satisfy a wait condition defined in a script. A particular message might completely satisfy a script if it is a single message wait or a message may help to satisfy a multiple message wait where a number of messages are required to satisfy the wait condition.

Any data associated with don't care variables specified within the message will be captured by step 1617. This is done by extracting values stored in fields in messages in the input buffer and storing them in the script variable memory. Step 1618 then deletes the message from the input buffer. Step 1619 determines if the message match completely satisfied the wait command. If it did step 1620 changes the script's state to active. In either case step 1621 is executed next. 1621 updates the script's message pointer. The script message pointer is an indicator that marks the next point in the input buffer the script will examine for messages. Step 1622 follows incrementing the script counter and then the process repeats at step 1610. If step 1610 determines there are no more scripts to examine, 1611 is executed to find the minimum script message pointer. The messages before the minimum pointer have been examined by each waiting script and are no longer possible matches for any script. Data beyond the message pointer are potential matches for the remaining waiting scripts. 1612 determines if the minimum value is zero. If it is not zero, there are messages before the minimum that are no longer potential matches and step 1613 will flush those messages into the exception buffer. In either case at this point the process input phase is completed at step 1614.

Figure 17:
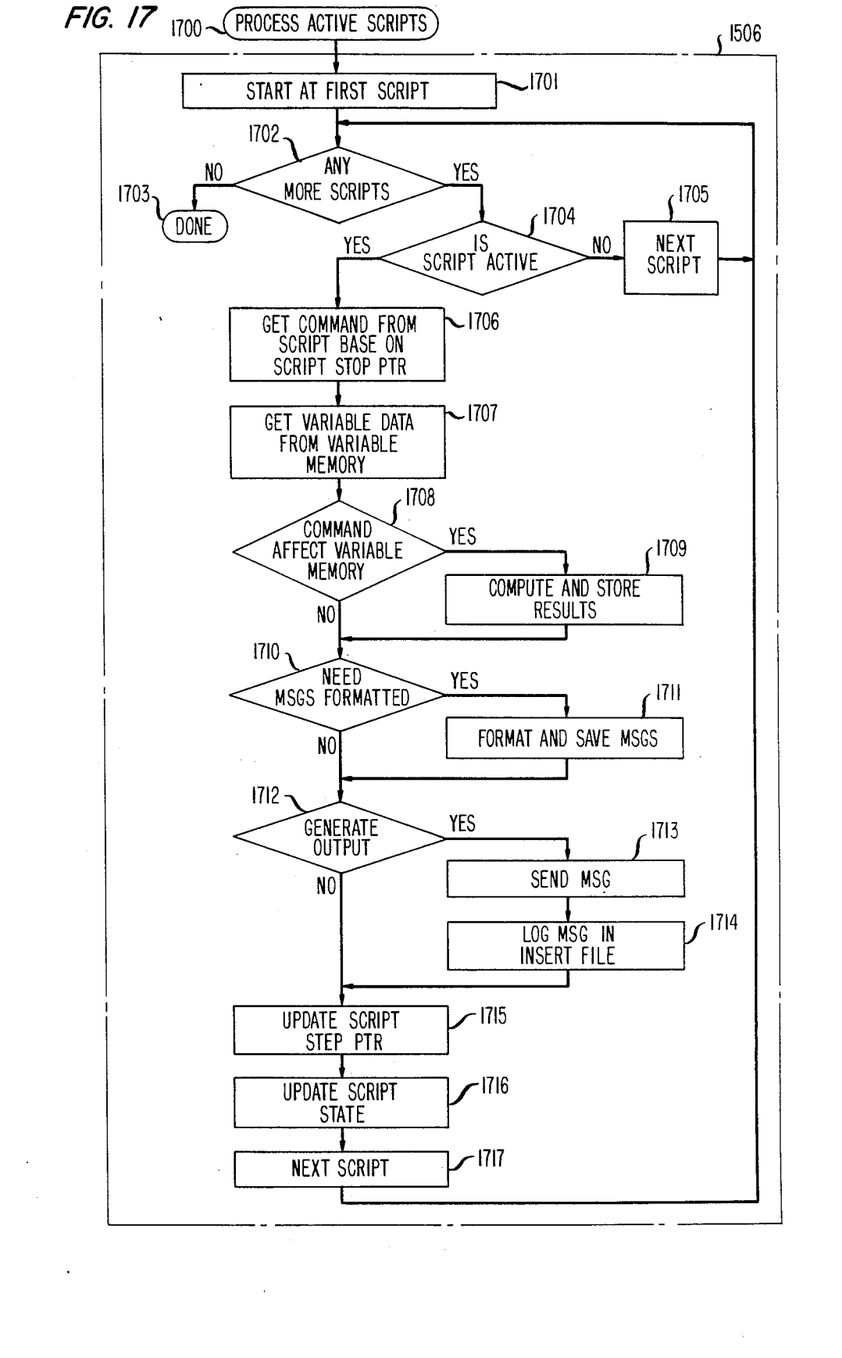

FIG. 17 is an expansion of the process active scripts step, 1506 of FIG. 15. This activity starts at step 1701 where the software cycles to the first script in the test. Step 1702 determines if there are any more scripts in the experiment. If there are none step 1703 is executed to complete this pass. If there are scripts still operational in the test, step 1704 is executed. Step 1704 determines if the particular script is active. If it is not, there is no work to be performed and step 1705 increments to the next script and the cycle repeats with examination of the next script's status. If a particular script is active, step 1706 is executed. This step obtains the command from the binary script based on a script step pointer that is kept for each script. The script step pointer is analogous to a program counter maintained for each script indicating the next script step to process. Step 1707 retrieves any variable data from variable memory associated with the particular command being interpreted. Step 1708 checks if this particular command is going to affect any variable memory, (e.g., a "set" command or an operation command to add two variables together). If this is true, step 1709 computes the value and stores the results in script memory. Step 1710 checks if this particular script command requires message formating (e.g., a "send" command or any of the wait commands). If it does, step 1711 extracts message information from the binary script, variable information from the variable table and formats and saves the message in a working area for later processing. Step 1712 then determines if the script is required to generate output messages for insertion by the access module. If it is, step 1713 takes the message just previously computed and transmits it to the access module. Step 1714 logs that message into an insert file. Step 1715 updates the script's step counter to the next step in the script. Step 1716 updates the script's state; the script can remain active, it can enter a delaying state, or it can enter a waiting state for a wait command. If a wait command was executed, the messages that were formatted and saved in a script's buffer area are examined by the process input data phase, 1505 of FIG. 15. In any case, step 1717 is executed which increments the script counter to the next script and the process repeats with that script until each script in the experiment is examined once.

Figure 18:
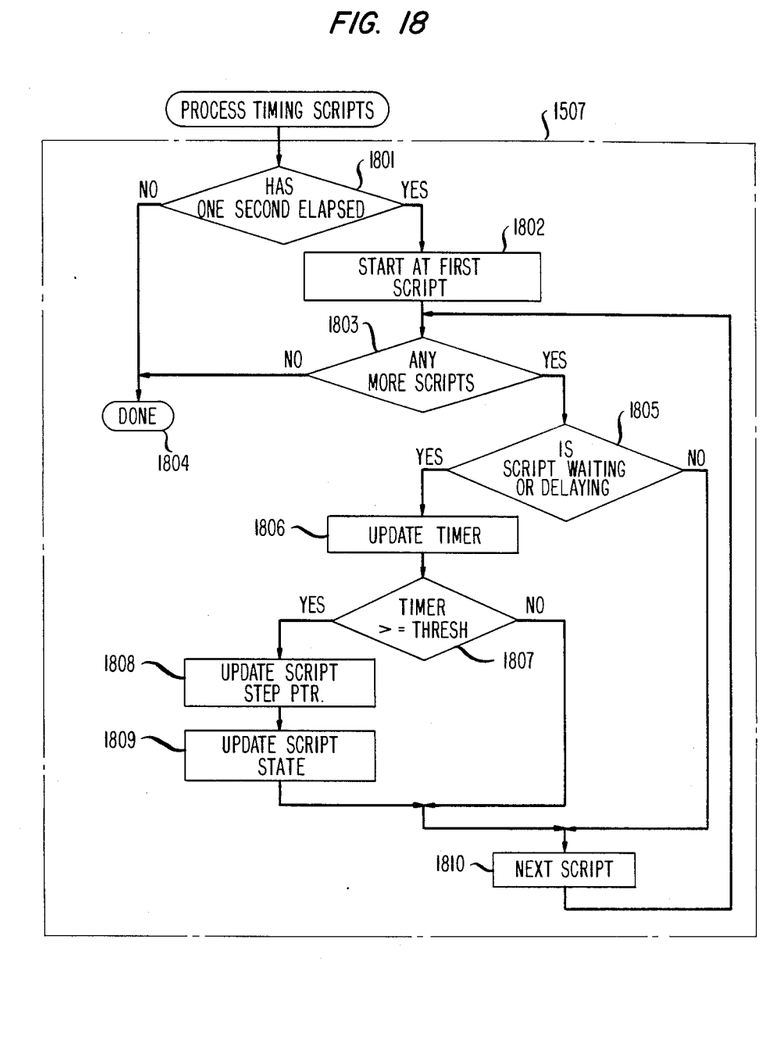

FIG. 18 is an expansion of process timing scripts from FIG. 15, step 1507. Step 1801 determines if a second has elapsed since the previous pass through this routine. If one second has not yet elapsed, step 1804 is executed which terminates this phase of operation. If one second has elapsed, step 1802 starts processing at the first script in the experiment. Step 1803 determines if that was the last script. If it wasn't, the processing continues at step 1805. If that was the last script in the experiment this phase is complete, at step 1804. Step 1805 determines if the particular script under examination is in the waiting or delaying state. If it is in neither, (i.e., it is actively performing computations or sending a message) no processing is performed and control skips to step 1810 which prepares to process the next script.

If the script is waiting or delaying, the timer associated with the particular script is updated in step 1806. In step 1807 the timer is compared with the threshold for the particular command, (i.e., the wait threshold for wait commands or the delay threshold for the delay command). If the timer has not exceeded the threshold, processing passes on to step 1810 and the next script is processed. However, if the timer has exceeded the threshold, step 1808 is executed, and the script step counter is incremented to the next step in the script. Then the script state information is updated by step 1809. Step 1809 will also log a wait-time-out exception into the exception file if the script was waiting. Then control returns to step 1810 to process the next script in the experiment. In this manner, any timing script has its timer updated and checked against its threshold.

Figure 19:
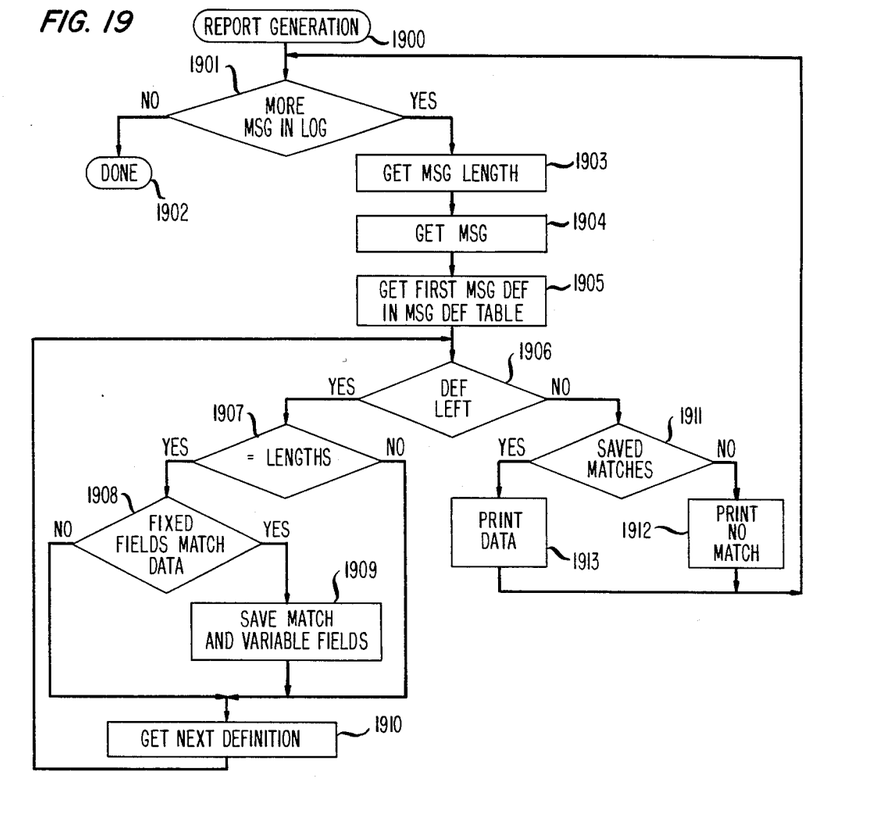

FIG. 19 is a flow chart for test analysis or report generation software. The software converts messages stored in test logs into displayable or printable reports so testers can examine test results. Software commences in step 1901 which determines if there are any more message stored in the input log. If there are not, step 1902 is executed indicating that the log has been completely processed and the report is complete. If there are more messages, step 1903 retrieves the length of the next message in the message log and step 1904 reads the message data. Step 1905 then obtains the first message definition from the message data base. Step 1906 determines if we have finished examining the message data base file for this particular message. If we haven't step 1907 is executed and the length is retrieved and compared with the message length from step 1903. If the message lengths are not the same, the message cannot match and control passes to retrieve the next definition in step 1910. If the message lengths are the same, a potential match exists. Step 1908 extracts the fixed fields defined in the message data base and compares them against the same bit positions in the input message in the log. If they don't match, the messages certainly don't match and control passes on to step 1910 and the next definition in the data base is examined. However, if they do match, step 1909 saves the match condition and all the variable fields in a temporary area for later printing. Processing then continues at step 1910 and the next definition from the message data base is examined. If there are no definitions left in the message data base, step 1906 branches to step 1911 where the software determines if there are any saved matches from step 1909. If there were none, step 1912 prints the string "no match" as well as the binary message data in the message log indicating that this is a message not defined in the system. On the other hand, if there were saved matches from step 1909, step 1911 branches to step 1913 where the information saved by step 1909 is outputted. This includes the message name and values of variable fields within each matched message. When output is complete step 1912 or step 1913 returns back to step 1901 to examine the next message in the message log. Notice that this software is designed to detect and print multiple message matches providing a message synonym capability.

Figure 20:
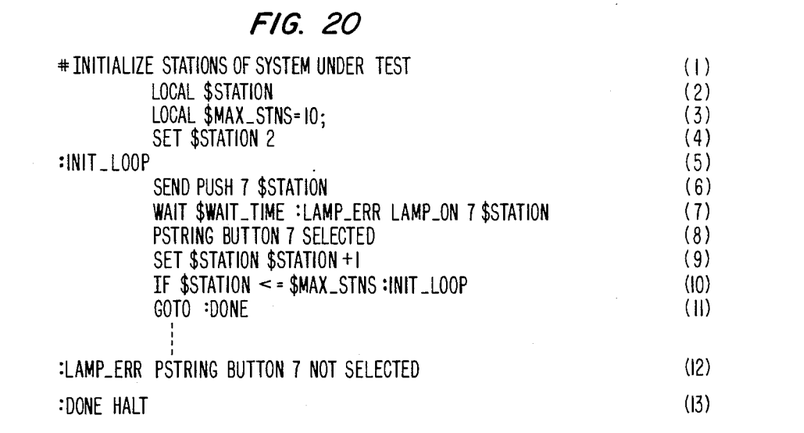
FIG. 20 shows one script.

FIG. 20 demonstrates a sample script to show a simple testing application from the example of a business communications system. The simple feature being tested is a preselection operation, i.e., when a customer pushes a button on a telephone terminal a LED associated with that button is supposed to be illuminated. This same preselection operation will be repeated for all sets in the system under test. This script is designed to verify the operation of this feature as well as highlight some of the commands in the testing language.

The first line is a comment. The second and third define two local script variables $station and $max-stns. The fourth statement assigns a value (2) to the station variable $station. The station variable can be thought of as a parameter for this script and allows the script to be applied for any particular station in the system. In this case it is being initialized to station 2. Line (5) five is a label followed by a send command on line six which instructs the script execution module to inject a "pushbutton" message through the access module into the system under test. The "7" of step (6) six indicates that button 7 is selected at the first station which, from step 4 is station 2. The business communication system should respond to this button by sending a message to node 101 (FIG.1) instructing the station set to turn a lamp on. The script designer verifies this at step seven by specifying a "wait" command that instructs the system to wait for a "lampon" message for $station (station 2) and lamp 7. The test system will wait for this message for a specified time interval, $waittime, also specified.

If the desired message does not occur, the script is instructed to branch to ":lamperr" at step twelve and the message "button 7 not selected 11" will be generated. Otherwise, the $station variable is incremented; its value is tested against the variable $max-stns, preinitialized to 10. If $station is $<=10$, the next station will be preselected, otherwise execution of this section of the script is complete at statement thirteen.

The script file is first processed by the test preparation software, and for each message, the message data base is consulted and the message is converted into the binary sequence that represents that message. However, since the variable $station is used in the script, the entire message cannot be computed at test preparation time, but instead a reference to the variable $station is included in the binary script, and at execution time the test execution module will access the variable memory, retrieve the value 2, convert it appropriately, place the value in the correct field, and store it in the message buffer for transmission to the system under test. As the script is executed, all input messages are recorded, so not only can the tester determine that the script has executed correctly but if it does not, the tester knows what went wrong by examining the message trace and the exception log.

CONCLUSION

While the invention is shown in a communication system it is understood that any type of system having interface boundaries can be tested in this manner. Fields and messages can occur in any order and size and once defined, the message description is stored in the data base as a specific message template. Then the test preparation module can recast the language statements of the test procedure into actual stimuli for presentation to the system under test and responses for comparison with response messages from the system under test.

It should also be understood that any number of steps can be taken to convert the high level programming language into interface signals depending upon the degree of specialization required of the test system. Also, while a local script storage memory is shown, it should be understood that the scripts may be stored or generated at a remote location and delivered to the test device as necessary. This arrangement has the capability of remaining in place after subsystems are combined thereby allowing for continued diagnostic capability. Also, the script messages may be applied to a system one message at a time from a terminal without actually using a script. System activity messages can be displayed or recorded for analysis.

What is claimed is:

1. A test device for use in conjunction with a system having a plurality of operations occurring within said system, said system having at least one interface point through which system messages pass, said system messages being either messages representative of operations occurring within said system or messages for controlling operations to be performed within said system, said test device comprising,
    means for obtaining a plurality of scripts, each script associated with a particular test sequence and having a plurality of language statements pertaining to said test sequences, each said script also containing language statements pertaining to the results which are expected as a consequence of test sequences applied to a particular system,
    means including a data base unique to a particular system under test and responsive to said means for obtaining for converting said language statements of an obtained script into a plurality of messages tailored to said particular system, certain of said messages for application to said system under test via said interface point to simulate certain system operations, and certain of said messages for comparison with messages received via said interface point as a result of said simulation messages being applied to said interface point, and
    means responsive to messages received from said interface point as a consequence of messages communicated at said interface point of said system under test for comparing said received messages with said script comparison messages to provide an indication as to the proper functioning of said system under test.

2. The invention set forth in claim 1 wherein said test device is operable with systems having missing components and wherein certain of said test device simulation messages are representative of operations that would be performed by said missing components.

3. The invention set forth in claim 1 wherein said script obtaining means includes means for obtaining from said interface point messages representative of operations occurring within said system.

4. The invention set forth in claim 3 further comprising means for simultaneously converting a plurality of scripts into input messages for simultaneous presentation to said interface point of the system under test, and
    means for comparing messages received from said output of said interface point as a result of applied input messages against comparison messages converted from the scripts corresponding to said applied input messages.

5. The invention set forth in claim 1 wherein said system is capable of receiving multiple concurrently applied external stimulus messages corresponding to operations to be performed by said system, and wherein said external stimulus results in particular sets of messages passing through said interface point, and wherein said test device includes means for generating language statements for controlling the application of messages to said interface point representative of selected particular message sets, some of said messages for simulating said multiple concurrently applied external stimulus messages and certain of said messages for comparison with messages received at said interface point as a result of said simulation messages being applied to said interface point.

6. A test device for use in conjunction with systems having a plurality of operations occurring within each system, each said system having a node for communicating messages representative of operations which occur within said system said node also operative for accepting messages representative of desired operations to be performed within said system, said test device comprising,
    means for storing a plurality of scripts each script having a plurality of statements corresponding to tests and test results which are desired to be performed with respect to a particular set of operations within certain of said systems, means for selecting from among said stored ones of said scripts a particular script, means unique to a particular one of said systems and responsive to said selection of said particular script for converting said selected script statements into system messages for communication to said node of said particular system, and means responsive to system messages received from said node of said particular system as a result of said selected script statements being applied to said node of said particular system for comparing said received messages with expected response messages as contained within said selected script to provide an indication as to the proper functioning of said particular system.

7. The invention set forth in claim 6 wherein said provided indication includes means for concurrently reporting incorrect system messages, extraneous system messages as well as missing system messages.

8. The invention set forth in claim 6 wherein said system includes communication systems having a plurality of modules each module communicating with one one or more other modules via interfaced messages and wherein said messages applied to said node and said messages received from said node include said interface messages.

9. The invention set forth in claim 6 wherein said script obtaining means includes means for obtaining from said node messages representative of operations occurring within said system.

10. The invention set forth in claim 6 wherein said system is capable of receiving multiple concurrently applied external stimulus messages corresponding to operations to be performed by said system, and wherein said external stimulus results in particular sets of messages passing through said node, and wherein said test device includes means for generating language statements for controlling the application of messages to said node representative of selected particular message sets, some of said messages for simulating said multiple concurrently applied external stimulus and certain of said messages for comparison with messages received at said node as a result of said simulation messages being applied to said node.

11. The invention set forth in claim 10 wherein said test device is operable with systems having missing components and wherein certain of said test device messages are representative of operations that would be performed by said missing components.

12. The method of testing systems which have a plurality of operations occurring within each system, each said system having an interface for communication with other systems, said interface having a node for communicating messages representative of operations which occur within said system, said node also operative for communicating messages representative of desired operations to be performed within said system, said test method comprising the steps of, storing a plurality of scripts, each script having a plurality of statements corresponding to tests and test results which are desired to be performed with respect to a particular set of operations within certain of said systems, selecting a particular script, and uniquely converting said statements of said selected script in accordance with a particular system into messages, communicating said converted messages to said node of said particular system, receiving system messages from said node of selected system as a result of said messages being communicated to said node of said selected system, and comparing said received messages with expected response messages as contained within said selected script to provide indications as to the proper functioning of said particular system as well as indications of extraneous system activity.

13. The invention set forth in claim 12 further including the step of monitoring said node to obtain from said node messages representative of system operations, and converting said obtained messages into said scripts.

14. The invention set forth in claim 13 wherein said converting step includes the concurrent conversion, communication and comparison, of a plurality of said selected scripts.

15. The invention set forth in claim 12 wherein said system is capable of receiving multiple concurrently applied external stimulus messages corresponding to operations to be performed by said system, and wherein said external stimulus results in particular sets of messages passing through said node, and wherein said test method includes the step of generating language statements for controlling the application of messages to said node representative of said particular message sets, some of said messages for simulating said multiple concurrently applied external stimulus and certain of said messages for comparison with messages received at said node as a result of said simulation messages being applied to said node.

* * * * *